United States Patent [19]
Hookway

[11] Patent Number: 5,996,349
[45] Date of Patent: Dec. 7, 1999

[54] AMMONIA CELL

[76] Inventor: John G Hookway, P.O. Box 6497, Auckland 1, New Zealand

[21] Appl. No.: 08/901,398

[22] Filed: Jul. 28, 1997

[30] Foreign Application Priority Data

| Sep. 10, 1996 | [NZ] | New Zealand | 299355 |
| Mar. 6, 1997 | [NZ] | New Zealand | 314358 |

[51] Int. Cl.$^6$ ........................................... F03G 6/00
[52] U.S. Cl. ......................... 60/641.11; 60/641.15
[58] Field of Search ................... 60/641.8, 641.15, 60/641.11, 641.12, 641.13, 641.14

[56] References Cited

U.S. PATENT DOCUMENTS

| 4,091,128 | 5/1978 | Franz et al. | 427/304 |
| 4,524,759 | 6/1985 | Butler | 126/452 |
| 4,586,339 | 5/1986 | Reid et al. | 60/641.7 |
| 4,829,768 | 5/1989 | Carden | 60/673 |
| 5,419,824 | 5/1995 | Weres et al. | 204/268 |
| 5,518,554 | 5/1996 | Newman | 60/641.8 X |

*Primary Examiner*—Hoang Nguyen

[57] ABSTRACT

Briefly put, solar energy is collected preferably over a vast area. Alternatively, this uses waste thermal energy. The heat provides for ammonia gas to be released at variable intervals from reservoirs, filling an inflatable piston head that rises within a cylinder filled with solvent, to do work on a generator. The gas withdraws into another reservoir; this returns the heat value of the gas released from solution and the gas itself through separate processes. As a waste energy user the invention attaches to a cooling pipe without modification to the power plant. Apart from the generator and the transfer of gas the invention avoids all movement of matter. Solutions do not move to any large extent; the conditions of them alter through equilibration.

8 Claims, 1 Drawing Sheet

AMMONIA CELL

TECHNICAL FIELD

The present invention relates to Solar energy collection devices used to create an electric current or those that maximise the electricity generated from an electric power station by utilising thermal waste. These solar energy devices rely on heat transfer. The technical field consists of both renewable energy resources and waste heat resources.

A previous attempt in this technical field was to use windmills or hydroelectric power. However, this solution is not always satisfactory because they are subject to limited natural causes.

Another previous attempt utilised silicon graphite solar cells and parabolic dishes. However, this solution is not always satisfactory because there is a lot of effort preparing this equipment for the yield that might result.

Another previous attempt, U.S. Pat. No. 4,524,759 describes the harness of solar energy through the thermal properties of ammonia. This solution is not always satisfactory; being a heat pump, it does not directly produce any power.

Another previous attempt, U.S. Pat. No. 4,829,768 describes the harness of solar energy through the use of ammonia as a fluid. Again, this solution is not always satisfactory because it requires large transfers of matter for the yield that might result.

Another previous attempt was the heat pipe reports of E. Schmidt. The described a heat pipe consisting of ammonia gas in a pipe as vibrating matter transferring heat; substantially it is the heat that transferred, not the matter. This method has a number of disadvantages; there must be some mechanical movement for a heat engine to do any work.

Another previous attempt was Ocean thermal electric conversion that makes use of a gradient in temperature to move a liquid, although this solution has a number of disadvantages. It suits only certain locations where a wide temperature differential exists between near sources of ocean water.

Another previous attempt was in the harnessing of wave, tide and ocean currents although this also proved unsatisfactory in that there are many practical problems to overcome.

In the field of utilising waste thermal heat, currently power stations generate thermal energy; for example, heated water. In this process some thermal energy converts to electricity, the rest is wasted. Typically, in a large power station a proportion of one third of the thermal energy converts to electricity.

In the field of utilising waste heat a previous attempt was U.S. Pat. No. 5,588,297. This describes a modified ericsson turbocharged reciprocating engine. This provides thermal efficiency between heat and reheat though this solution is not entirely satisfactory. It uses a piston engine and a compressor for the high and low pressure cycles. This involves a lot of moving parts and moving material for the yield that might result. Also, this type of engine requires the combustion to take place in a cylinder in such a way that limits combustion to the workings of the cylinder; the size of the cylinder is limited, requiring many revolutions per minute. Also, this involves a lot of modification to take place to the waste heat source to generate the high pressure rates that this solution requires. Another attempt was to run a turbocharger though that requires precise manufacturing for the yield that might result.

U.S. Pat. No. 5,595,059 describes the use of a stream of compressed flue gas via thermochemical recuperation. This has a number of disadvantages. It has the inefficiency of combusting gas and is best used incorporated into the power plant's turbine from which any waste heat is obtained. This has the disadvantage of having to make major modifications to the power plant from which any waste heat is obtained.

U.S. Pat. No. 5,590,528 describes a heat exchanger. Though this is not entirely satisfactory—it suggests the use of higher temperatures than available as waste heat.

U.S. Pat. No. 5,586,442 describes a hydrokinetic amplifier that merges a working vapour and liquid to absorb heat. It does not readily provide, in its self, a means to produce electricity from this heat.

U.S. Pat. No. 4,292,809 describes a means to convert low grade thermal energy into mechanical energy through a heat exchanger. This is not satisfactory as it employs a wide range of heating and cooling sets that reduce the efficiency.

There are a number of disadvantages inherent in any attempt to increase the proportion of thermal heat converted to electricity. These include the necessity to compete economically with the efficiency of existing large scale power production. Also, to avoid altering the workings of the power station any attempt must be suited to the existing readily available resources of the power production.

SUMMARY OF THE INVENTION

A broad statement of the invention is to transform heat transfer into gravitational potential energy. The invention also shows a capacity to slow down or brake the potential movement of matter in a heat pipe, to exploit as an electric current, the difference of energy between two heat sources.

In summary, gas is released during heat transfer and drives a turbine. The gas is lighter than the solvent and when released represents gravitational potential energy. The general idea is to collect solar energy over a vast area and to convert that energy into work done within a smaller area at another time. By its nature (and another advantage of the invention) it presents few reasons not to include a vast solar energy collection area. The object of the present invention is to provide a solar device that will go at least some way towards avoiding the above disadvantages.

DETAILED DESCRIPTION OF THE DRAWING

Figure 1:
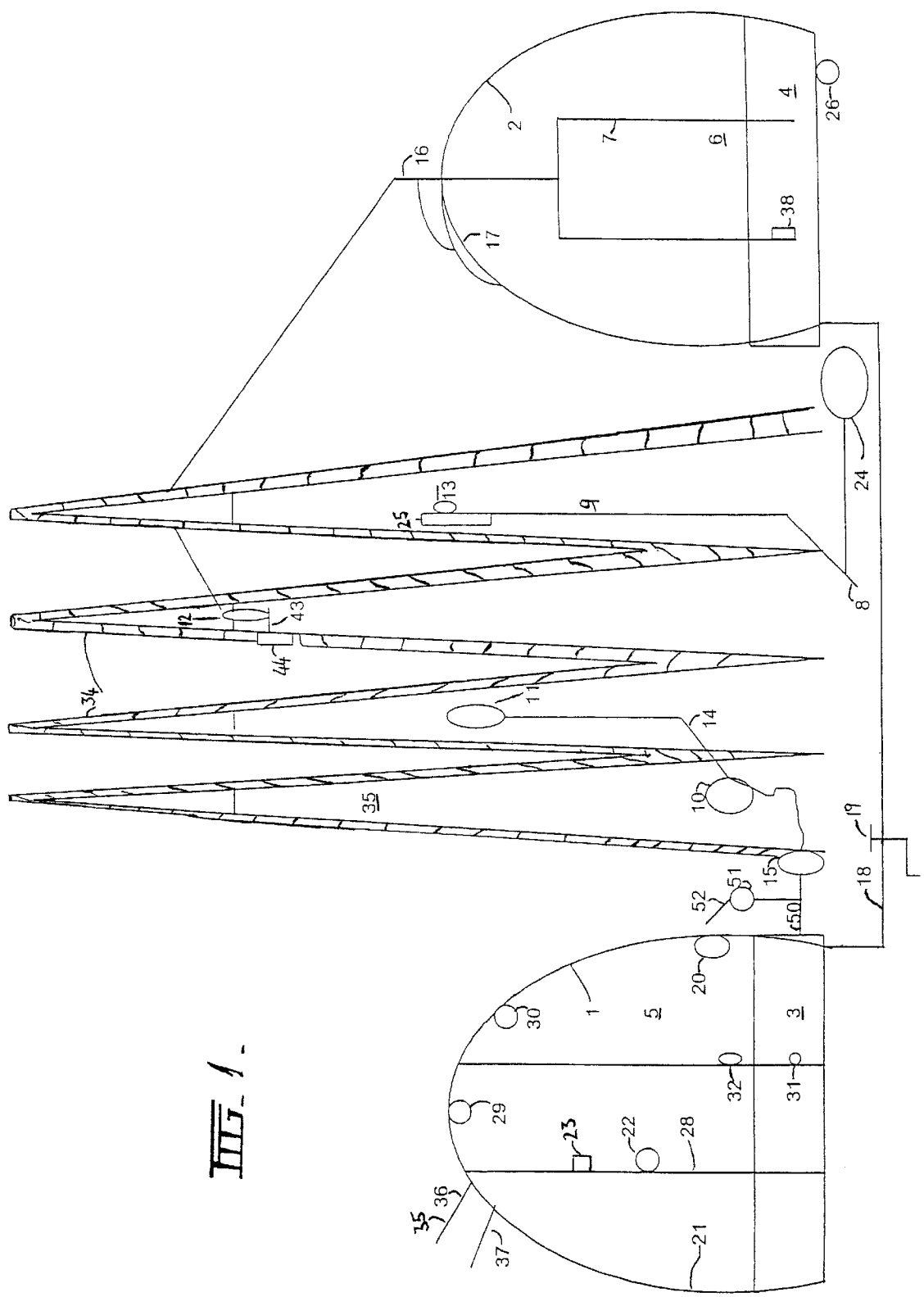
FIG. 1 shows gas, 5 transfer between reservoirs, 1, 2 via capsules, 10,11,12,13 that rise and do work on a turbine, 8.

In FIG. 1, there is a vessel consisting of three reservoirs connected by a pipe and closable orifices with a lever connected to a generator (in accordance with the invention), assembled as one unit.

There is a warm reservoir 1, a cool reservoir 2, a seasonable reservoir 21, and a lever 8. All materials are waterproof, heat and pressure resistant and treated against any corrosion that might occur from long term exposure to a low pH solution. The materials facilitate necessary safety procedures in handling chemicals, corrosion problems and precipitation of salts.

In this process, procedures of operation include both the warm and cool reservoirs 1 and 2 that are part full with ammonium hydroxide solution 3 and 4. The contents of the cool reservoir 2 remain at a lower temperature than the contents of the warm reservoir 1. Ammonia gas 5 releases during the chemical reaction $NH_3 + H_2O \leftrightarrow NH_4OH + heat$, from the warm reservoir 1. The ammonia gas 5 in the warm reservoir 5 will exert a pressure within the warm reservoir 1. Gas escapes from the warm reservoir 1 to fill a capsule 10 that will rise to exert a force on a lever 8. This capsule is inflatable. During this process this capsule acts as a piston.

A capsule when rising 11 within a cylinder 34 exerts a force suited to produce an electric current upon the lever 8. The lever 8 is part of a paddle connected to an electric generator power plant 24.

Gas released from a point at the top of the cool reservoir draws through a pipe 7.

The warm reservoir, 1, consists of two separate reservoirs, 1 and 28. In order to avoid explosions, each separate reservoir 1 and 28 are equipped with valves 29, 30 to release excess pressure. Other ways to regulate pressures are possible, however.

In this process, the relay of heat includes the filling capsule 10 that is the capsule being filled with gas 5 and attached to the valve 20 by a set of pipes 14.

The filling pipe 14 is one of a system of pipes 14. The pipe 14 fills the capsules 10, 11, 12, 13 with gas 5 from the warm reservoir 1. The capsules are inflatable. The filling pipe 14 attaches to the capsules 10, 11, 12, 13 at one end of the pipes and to a valve on the warm reservoir 20 at the other end. The majority of the length of filling pipe 14 coils on a reel 15. The reel 15 designed to uncoil pipes as capsules rise ensures a pipe maintained flush. The filling pipe 14 has a system of closable orifices.

The valve 20 releases gas 5 from the warm reservoir 1. The valve 20 fills the filling capsule 10. For ensuring an ideal pressure within the filling capsule 10, the filling valve 20 allows a different pressure to exist between the warm reservoir 1 and the filling capsule 10.

The filling capsule 10, filled with ammonia rises, when required, due to the chemistry of molar weight and volumes.

There is a system of tracks 9 designed to provide a near frictionless passage of a number of fittings 25.

An inflatable capsule 11 attaches to one of the fittings 25 on one of the tracks 9. The system of tracks 9 rise vertically. The fitting 25 on the system of tracks is connected to the lever 8.

The refilling area, shaped to allow capsules to rise vertically when full, is the area near the reel 15.

The arrangements of capsules ensure a steady quantity of work applied to the turbine 8.

There is a cylinder 34 that is partially filled with a solvent 35. This cylinder is part of a system of cylinders 35. The system of tracks 9 is located within the cylinder.

The cylinder provides for space surrounding the capsules for solvent to flow. The capsules have a higher specific gravity then the solvent and therefore when empty will descend down through the cylinder.

Gas releases from the reservoir 1 at a pressure that is calculated in accordance with the quantity of solvent 35, within the water tower.

The rising capsule 11 is full of ammonia gas, rising along the system of tracks 9. As the rising capsule 11 rises it exerts a force suited to produce an electric current upon the paddle 8.

When the rising capsule 11 has finished exerting a force on the paddle 8 it rises to the arrival area. The arrival area is near the reel 17 at the top the system of tracks 9.

The arrival capsule 12 is a capsule that has risen to the top of the system of tracks 9.

There is the freeway piping 7. The freeway piping 7 is a system of piping provided with a system of closable orifices, running from the arrival area near the reel 17 to the cool solution 4. The freeway piping ensures ammonia will flow from the arrival area to into cool solution 4. The freeway piping ensures cool solution 4 does not rise up the freeway piping 7 to the arrival area near the reel 17.

There is arrival piping 16, a system of piping with closable orifices connecting capsules 10, 11, 12, 13 to the freeway piping 7. A reel 17 uncoils pipe 16 as capsules 10, 11, 12, 13 fall and ensures a pipe maintained flush.

The arrival capsule 12 positioned to fall down the tracks 9 is stopped. At this point, the arrival piping 16 opens to allow the ammonia within the deflating arrival capsule 12 to flow into the freeway piping 7.

There is a retractable lever 43. The lever is provided with a device 44 that allows the lever to retract. When the capsule is being emptied of gas the capsule rests on the lever 43. When required and when the capsule is emptied of gas, the lever 43 retracts. The retractable lever is part of a system of retractable levers near the top of the system of cylinders 34.

There is a falling capsule 13. The falling capsule 13 is a capsule that has deflated at the arrival area and is falling, due to gravity, along the system of tracks 9, towards the refilling area near the reel 15.

The systems of closable orifices within the arrival piping 16, filling piping 14 and freeway piping 7 open and close electrically.

In this process thermal factors include a tap 19. The tap 19 is part of a pipe 18. The pipe 18 runs between the cool and the warm reservoirs 1, 2 and allows solution 3, 4 to run between the cool and the warm reservoirs 1, 2. The valve 19 also provides for removing and adding solution In to the reservoirs.

The system of capsules 10, 11, 12, 13 and tracks 9 within the invention operate while the temperature of the warm solution, 3 is rising. When the temperature of the warm solution, 3 is falling the concentration of ammonia within the solution in cool and warm solutions 3,4 equilibrate with an open valve 19.

The warm reservoir 1 operates substantially as an ammonia gas environment.

A bag 23 inflates to fill the warm reservoir during any temperature fluctuations that cause a low pressure environment within the warm reservoir 1. Other configurations for the purpose of relieving a low pressure environment are, however, possible.

The capsules 10, 11, 12, 13, ensure heat do not emit from the gas within the capsules.

The cool reservoir 2 contains a mixture of air and ammonia gas 6 designed to operate in a low pressure environment.

The cool and warm reservoirs 1 and 2, designed with shapes, filters, vacuums and insulation control the emission or retention of heat. Air will adopt a predictable flow around the cool and warm reservoirs 1 and 2. The materials and design of cool and warm reservoirs 1 and 2 enhance any temperature variations, which result from this phenomenon.

The reservoirs 1 and 2 operate with the maximum concentration of ammonium gas 5 possible. The warm reservoir 1 varies through the widest temperature range possible that is significant to the adsorption properties of ammonium hydroxide.

Solutions or gases can flow to and from the seasonable reservoir 21 and the warm reservoir 1 through the valve 22. This is to accommodate changes arising from seasonal variations in the hottest temperature of the day. The seasonable reservoir remains as cool as possible. Apart from the suitable flow behaviour of the gas, other ways of having gas rise and do work are however possible. Other ways of separating the water tower into areas in which gases can rise are also possible.

In this process, additional factors include a timing device 26 to record temperatures, pressures and time intervals of all important functions. This also provides information and transmits signals to the electronically controlled closable taps, valves and orifices.

For the purpose of transferring gas and solution, the reservoirs are connected at both gas and water levels with valves 31, 32.

Operational velocities, forces, volumes, distances and pressures fall within the parameters required to ensure the system of capsules a smooth passage. The capsules enter the water tower filled with gas at a pressure. As the capsules rise up through the water tower the capsules expand in volume in accordance with the progressively reduced pressure exerted upon them from the water tower. There are only minimum fluid movements within the water tower.

In the form shown the reservoirs are equipped with a blind 35 that is coloured to reflect or absorb sunlight and is pulled across the reservoirs with the aid of an electronic pulley 36. Other ways to monitor sunlight are however possible.

The reservoirs are equipped with an aerodynamic flap 37. This is used to regulate the movement of air surrounding the reservoirs. Other ways of regulating the movement of air are however possible. In the form shown, the aerodynamic flap is pushing heated air from the cool reservoir towards the warm reservoir.

The piping 7 is equipped with a device 38 to provide for a variable diameter at the bottom of the pipe. In the form shown the device 38 also monitors the pressure, temperature and flow rates of gas within the pipe 7.

Gas can flow through a pipe 50. This pipe connects the reservoir 1 to the entry of the gas delivery apparatus 15. This process also includes a gauge 51 for monitoring pressure and a switch 52 that turns when the gauge registers the required pressure.

In particular, unique constructional elements include the capsules that act as pistons and which are inflatable and transform heat transfer into gravitational potential energy. The capsules co operate with the solvent to rise and transfer heat energy to gravitational energy, co operating with the tanks to collect heat energy over vast areas. Also, the piping is of variable shape to monitor the flow of gas and co operates with the insulation systems of the reservoirs.

The best way to use the invention requires: a) equip the invention with a relatively large two dimensional receiving area because the volume of the capsules increases three dimensionally and b) incline the receiving area to the latitude c) to recycle the ammonia through the various cycles a large number of times.

What I claim is:

1. An energy collection system including:
   a first reservoir means for containing ammonium hydroxide solution,
   a second reservoir means for containing ammonia gas,
   a conveyor means for conveying gas from the first reservoir to the second reservoir and extracting mechanical energy therefrom after the solution changes to a gas with a set of at least two reservoirs
   a) that releases and retrieves the ammonia gas to and from a gas delivery apparatus
   b) are interchangeable with one another for purposes of equilibrating solutions,
   c) provide a system of reallocating thermal energy, between reservoirs, through a system of heat pipes such that temperature differentials will produce thermal flow,
   d) provide a system for transferring the ammonia in solution, between reservoirs, by equilibrating or creating variations in concentrations of the ammonia in solution through a method of temperature differentials.

2. An energy collection system including:
   a first reservoir means for containing ammonium hydroxide solution,
   a second reservoir means for containing ammonia gas,
   a conveyor means for conveying gas from the first reservoir to the second reservoir and extracting mechanical energy therefrom after the solution changes to a gas with a system of gas delivery that provides work done when the gas rises through a solution by a method of providing pressurised gas that will rise through a solvent exerting work on a generator.

3. An energy collection system including:
   a first reservoir means for containing ammonium hydroxide solution,
   a second reservoir means for containing ammonia gas,
   a conveyor means for conveying gas from the first reservoir to the second reservoir and extracting mechanical energy therefrom after the solution changes to a gas with an apparatus for gas delivery that provides work done when the gas rises through a solution consisting of:
   a) at least one inflatable capsule
   b) a system of closable orifices that will allow the release of the ammonium gas at variable volumes and pressures into a system of inflatable capsules,
   c) a method of filling capsules and transferring the gas to and from reservoirs
   d) at least one vertical structure filled with solvent through which a capsule can rise,
   e) a mechanical attachment between a capsule and a generator.

4. An energy collection system including:
   a first reservoir means for containing ammonium hydroxide solution,
   a second reservoir means for containing ammonia gas,
   a conveyor means for conveying gas from the first reservoir to the second reservoir and extracting mechanical energy therefrom after the solution changes to a gas with a method for a) gas delivery that provides work done when the gas rises through solution and b) the supply and retrieval of ammonia where the connection between the two methods is a) the supply methods provides the ammonia gas that the gas delivery apparatus uses and b) the gas delivery apparatus delivers the gas for the retrieval method.

5. An energy collection system including:
   a first reservoir means for containing ammonium hydroxide solution,
   a second reservoir means for containing ammonia gas,
   a conveyor means for conveying gas from the first reservoir to the second reservoir and extracting mechanical energy therefrom after the solution changes to a gas with a method of disassociating the ammonia gas from the ammonium hydroxide to provide pressurised gas and a method of returning disassociated ammonia to a disassociation reservoir such that both (a) substantially all the energy value of disassociation and (b) substantially all the ammonia returns to the dissociation reservoir.

6. An energy collection system including:

a first reservoir means for containing ammonium hydroxide solution, a second reservoir means for containing ammonia gas, a conveyor means for conveying gas from the first reservoir to the second reservoir and extracting mechanical energy therefrom after the solution changes to a gas that, by providing heat to the ammonia gas, by disassociating the ammonia gas to and from ammonium hydroxide solution, will generate work done substantially only from a rise of gas pressure.

7. An energy collection system including:

a first reservoir means for containing ammonium hydroxide solution, a second reservoir means for containing ammonia gas, a conveyor means for conveying gas from the first reservoir to the second reservoir and extracting mechanical energy therefrom after the solution changes to a gas that transforms any energy flow resulting from solar energy into the flow of a gas through a gas delivery apparatus.

8. An energy collection system including:

a first reservoir means for containing ammonium hydroxide solution, a second reservoir means for containing ammonia gas, a conveyor means for conveying gas from the first reservoir to the second reservoir and extracting mechanical energy therefrom after the solution changes to a gas with a solar panel element to collect and focus solar radiation to where incident solar radiation on a mass of ammonium solution raises the temperature of the ammonium solution.

* * * * *